May 7, 1935. R. O. HURD ET AL 2,000,595
APPARATUS FOR ELECTRICAL TESTING
Original Filed July 1, 1931 2 Sheets-Sheet 1
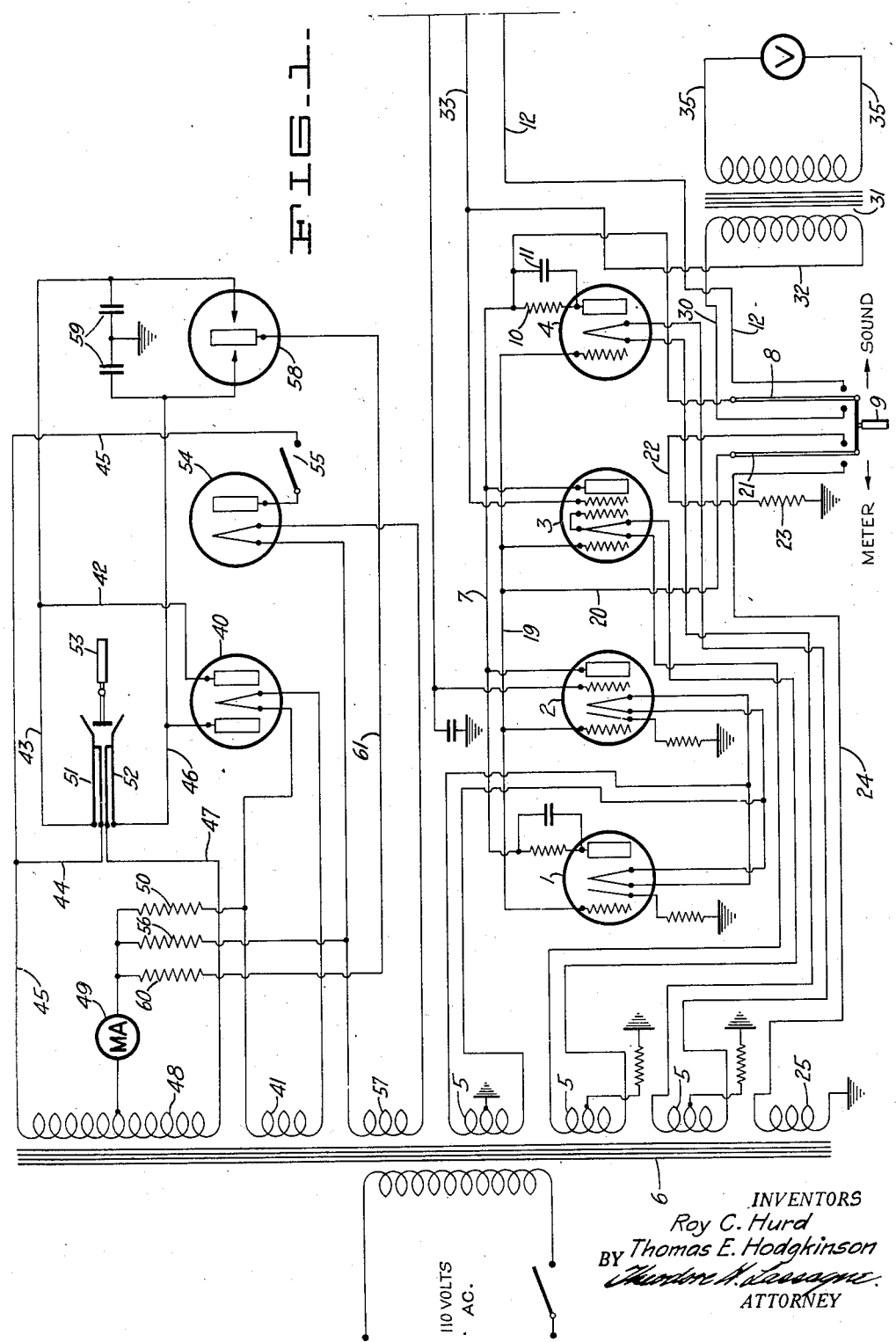
INVENTORS
Roy C. Hurd
Thomas E. Hodgkinson
BY
ATTORNEY

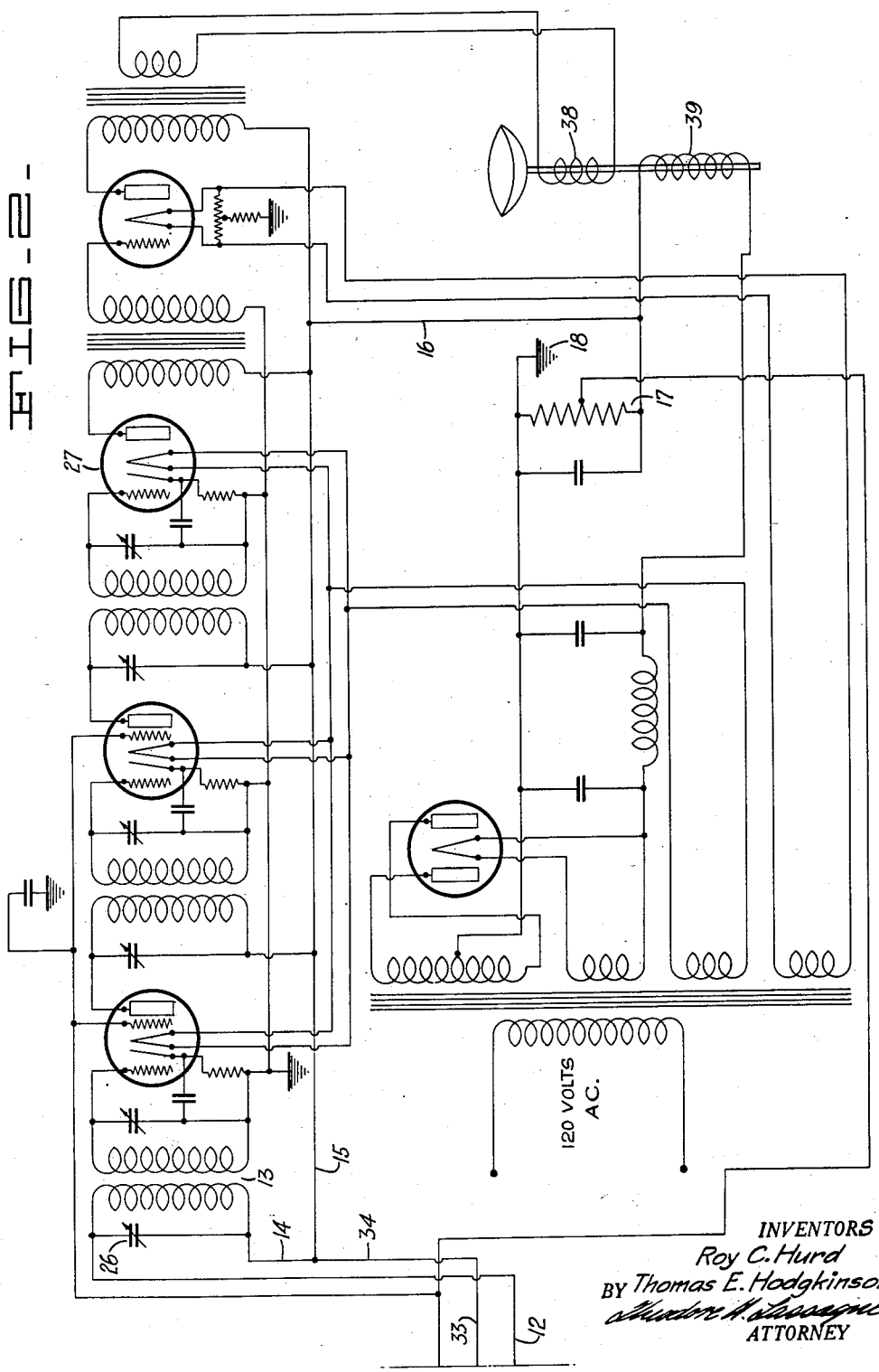

Patented May 7, 1935

2,000,595

UNITED STATES PATENT OFFICE 2,000,595

APPARATUS FOR ELECTRICAL TESTING

Roy O. Hurd and Thomas E. Hodgkinson, San Francisco, Calif., assignors to Newton J. Hale, San Francisco, Calif.

Application July 1, 1931, Serial No. 548,069
Renewed October 16, 1934

5 Claims. (Cl. 250—27)

The present invention relates to methods and apparatus for testing electrical apparatus and concerns particularly an improved method and apparatus for detecting latent defects in devices, such as vacuum tubes, designed for use in hypersensitive apparatus used in radio telegraphy, telephony, television, etc.

The most important of such defects are those caused by such abnormalities as shorting, opening, or varying the electrical relation etc., of tube circuits or elements due to mechanical vibration, thermal conditions within the tube or the presence of gas therein. Particularly where such changes occur intermittently and are of extremely minute duration they are sufficient to cause noise (or flickering and streaking in television apparatus) when the tube is placed in operation, and yet are extremely difficult of detection.

It is an object of the present invention to provide an improved method and apparatus for testing for such defects, whereby the presence of such defects will cause radio frequency oscillations to be set up in the testing apparatus, from which sensible indications of the defect present may be produced.

Another object of the invention is the provision of apparatus adapted to apply a plurality of types of tests to such devices.

Other objects will appear hereinafter.

A preferred form of apparatus for carrying out the above objects is illustrated in the accompanying drawings forming a part of this specification, in which:

Figure 1 is a diagram of the electrical connections of the testing apparatus for metering output, and a portion of the structural testing apparatus, and Figure 2 is a continuation thereof, showing detection and indication apparatus connections and power supply.

In the preferred form of apparatus here disclosed, a plurality of tube sockets are provided for receiving the various types of tubes 1, 2, 3, and 4 to be tested therein and filament current of the proper voltage for each type of tube is provided by a plurality of secondaries 5 of transformer 6. The plate prong contacts of all the test sockets are connected in gang by lead 7 to the right hand traveling contact 8 of the testing switch 9 through appropriate resistances 10 each of which is shunted by a by-pass condenser 11 for the purpose of appropriately reducing the plate current to the various types of tubes without interference with radio-frequency currents in the plate circuit.

In testing for structural defects, the traveling contact 8 is thrown to the right connecting the plate of the tube under test, via lead 12 to the primary winding of a radio-frequency transformer 13 and thence via leads 14, 15, and 16 to one side of the D. C. power supply at 17, the other side of said power supply being grounded to the frame at 18. The power supply may be of any desired form delivering approximately 250 volts D. C., and is shown as comprising a step-up transformer, rectifier tube, and filters of conventional types.

A condenser 26 shunted across the primary of transformer 13 forms an oscillating circuit therewith, in which variations of extremely minute duration in the plate current of the tube under test set up oscillations the duration of which is controlled only by the logarithmic decrement, and hence a high frequency oscillating circuit is desirable. In practical operation a frequency of 175 kilocycles has been found satisfactory, but any variation from this value would obviously affect the result only in degree.

The grid prong contacts of all the test sockets are ganged on lead 19 which is connected via lead 20 to the left hand traveling contact 21 of main switch 9, whereby when the switch 9 is thrown to the right, the grid of the tube under test is grounded via lead 22 through resistance 23 and, when switch 9 is thrown to the left is connected via lead 24 to secondary winding 25 of transformer 6 which acts as a C battery. The other elements of the tube under test are connected in the conventional manner as indicated by the diagram.

The output of radio frequency transformer 13 is coupled through radio frequency amplifying, detector and audio frequency amplifying stages of conventional form, as shown in the diagram, to any device for producing sensible indications of variations in the output of the detector stage; in the present disclosure, to the moving coil 38 of a dynamic type loud speaker, the fixed coil 39 of which is supplied with current from the rectifier, as shown.

A tube to be tested, is placed in the testing socket 1, 2, 3, or 4 provided for tubes of its particular type and switch 9 is thrown to the right. The tube being thus connected in circuit in the same manner as in ordinary operation, defective tube structure affected by thermal conditions therein, the presence of gas, etc., will cause variations in the plate current. These variations, however, are usually of such very minute duration as to be incapable of affecting, either directly or through mere audio frequency amplification, the diaphragm of a speaker or other sensible indication device, and the present invention is directed to a method and apparatus for rendering such variations perceptible.

For this purpose, the plate circuit of the tube under test is connected to an oscillating circuit formed by the primary of transformer 13 and condenser 26, and even the most instantaneous fluctuations of current in the plate circuit act to set up oscillations of the selected radio frequency in the primary of transformer 13. Such oscillations terminate by decay, but persist appreciably longer than the plate current variation initiating them, and are of sufficient duration to operate sensible indicating devices in cases where their originating current variation would not have been. This is clear from the well known fact that the force required to produce a given movement varies inversely as the square of the time during which it is exerted, and that therefore the current required to produce an audible movement of a speaker diaphragm varies inversely as the square of the time during which it is applied. It is thus clear that if the duration of an impulse to the sensible indication device can be doubled, an amplitude equal to the square root of its original amplitude will be sufficient to produce the same effect thereon, and it is by taking advantage of this principle that the present invention obtains its result.

Oscillations so caused in the primary of transformer induce similar oscillations in the resonated secondary thereof, which are amplified by successive radio frequency stages of conventional design, as shown, rectified in a detector stage 27, and act through optional audio frequency stages of amplification to operate the diaphragm of the speaker through coil 38.

If no defects have been made apparent in the progress of the test to this point, the tube is then vibrated either manually or by suitable mechanical means, when additional defects such as those due to looseness or insufficient support of elements or the intermittent shorting or opening of circuits within the tube will be indicated in the same manner by the same means above set forth.

If no defects are made apparent by these tests, a tube giving a satisfactory emission may be considered satisfactory for use in a radio or television receiving set, since all defects capable of producing interference in such apparatus have been demonstrated to be absent. All tubes to be used in such apparatus, including rectifier tubes, should be so tested, for a tube functioning in the audio frequency stages of a receiver may be wholly free from defects capable of producing audio frequency disturbances and yet may create disturbances which will be picked up by the adjacent radio frequency stages and become audible as noise in the speaker. Similarly, a rectifier tube so placed in the circuit as to be incapable of transmitting audio frequency disturbances to the speaker may create disturbances which will be picked up by nearby radio frequency stages and thus appear as noise in the speaker.

Each tube is also tested by an A. C. voltmeter adapted to be coupled into the plate circuit of the tube under test by throwing switch 9 to the left. The right traveling contact 8 of this switch is, as above set forth, connected to the plate prong contacts of all the test sockets, and thus the throwing of this switch to the left connects the plate of the tube under test via lead 30 to the primary winding of transformer 31 and thence via leads 32, 33, 34, 15, and 16 to power supply. The secondary winding of transformer 31 is connected by leads 35 to any well known type of hypersensitive A. C. voltmeter. A satisfactory type of voltmeter for this purpose consists of a D. C. voltmeter having a dry pile rectifier built in, together with the usual means for bringing the meter into the proper range.

The left hand traveling contact 21 of switch 9 being connected to the grid prong contacts all of the test sockets, and the throwing of the switch serves to connect the grid of the tube under test via lead 36 to a secondary winding 37 of transformer 6.

This arrangement is merely illustrative and any well known type of meter test may be substituted therefor.

Separate metering circuits, functionally associated with the structure testing apparatus, are provided for determining the emission of the various types of rectifier tubes.

A test socket is provided for receiving a full wave rectifier tube 40 which receives its filament current from a secondary winding 41 of transformer 6. The plates of the tube are connected via leads 42, 43, 44, 45, 46, and 47 to opposite ends of a secondary 48 of transformer 6 supplying the proper alternating current voltage therefor, and from a central tap thereon through a D. C. milliammeter 49, containing a shunted resistance, through resistance 50 to the filament circuit. Switches 51 and 52 are provided in the circuit of each plate, either of which may be opened by throwing key 53 thereof up or down to test the efficiency of each plate separately.

The rectifier tube 40 having been placed in the testing socket, any disturbances created within the rectifier tube either spontaneously or upon vibration thereof will be picked up and made audible in the speaker, the mere proximity of the circuits being sufficient to effect reception of these disturbances if the circuits of the primary of transformer 13 are within a few inches of the tubes. Furthermore, by throwing key 53 first in one direction and then in the other, one plate and then the other may be cut out of circuit and the specific defective element causing the disturbance thus determined. If it is desired to locate the specific defective element in multiple element tubes such as shown at 1, 2, and 3, similar switches may be provided for cutting out the various elements selectively.

A half-wave rectifier tube 54 may be similarly tested, its single plate being connected through cut out switch 55 via lead 45 to secondary 48 and thence by the central tap through voltmeter 49 and resistance 56 to the filament circuit of the tube, supplied by secondary winding 57 of transformer 6.

Means are also provided for testing raytheon tubes, such as shown at 58, the cathodes of which are shunted by buffer condensers 59 and connected via leads 43 and 46 through switches 51 and 52 through secondary 48, voltmeter 49, and resistance 60 via lead 61 to the anode.

It is obvious that the method of testing herein disclosed could be carried out with apparatus differing materially from that herein disclosed. For instance, by providing a separate source of plate voltage for the tube to be tested, it would be possible to connect the plate of said tube and one side of said plate voltage line to the antenna and ground connections of any type of radio receiving set, and by properly tuning the set practice the method here disclosed.

Furthermore, it is not necessary for an actual physical connection to be provided between the tube under test and the detector, since any relation whereby the disturbances may reach the oscillating circuit will suffice, as is illustrated by the fact that disturbances in tubes situated as tubes 40, 54, and 58, will be picked up and rendered audible in the speaker, or by the fact that if the condenser 26 is eliminated, oscillations will nevertheless be set up in the resonated secondary circuit and the same result secured. Even with both condensers eliminated, the distributed capacity of the windings and tube would be sufficient in many cases to set up the necessary oscillations.

It is therefore obvious that variations in the apparatus disclosed will occur to those skilled in the art, and it is therefore understood that, both as to the method and apparatus, the invention is limited only by the fair scope of the appended claims.

We claim:

1. In a vacuum tube testing apparatus, means for audibly simulating the effect of a defective tube's operation in a radio receiving set comprising audible reproducing mechanism, means for prolonging the effect of transient impulses in a tube, comprising an oscillatory circuit cooperatively associated therewith, and means for rectifying and conveying to said mechanism oscillations produced by defects in a tube under test.

2. In vacuum tube testing device, means for simulating the effect of a defective tube's operation in a receiving set comprising reproducing mechanism, a detector of radio frequency oscillations cooperatively associated therewith, means for prolonging the effect of transient impulses in a tube, comprising an oscillatory circuit including said tube, and means for picking up and conveying to said detector, oscillations produced by defects in a tube under test.

3. In vacuum tube testing apparatus, the combination of energizing circuits, means for connecting a tube to be tested in said circuits, and means comprising an oscillating circuit having reproducing mechanism associated therewith for producing audible indications of disturbances caused by any element of the tube under test.

4. In a vacuum tube testing apparatus, means for audibly simulating the effect of a defective tube's operation in a radio receiving set comprising audible reproducing mechanism, means for prolonging the effective duration of a tube disturbance, comprising an oscillatory radio frequency circuit cooperatively associated therewith, and means for detecting and conveying to said mechanism, oscillatory disturbances produced in said circuit by defects in a tube under test.

5. In a vacuum tube testing apparatus, the combination of energizing circuits, means for connecting a tube to be tested in said circuits, audible reproducing mechanism associated therewith for indicating defects in a tube under test, and electrical means for prolonging the effect upon said mechanism of each individual electrical disturbance occurring in the tube under test.

ROY O. HURD.
THOMAS E. HODGKINSON.